United States Patent
Sutherland

(10) Patent No.: US 9,750,348 B2
(45) Date of Patent: Sep. 5, 2017

(54) USER STABILIZED STOOL

(71) Applicant: Bryon Neal Sutherland, Dallas, TX (US)

(72) Inventor: Bryon Neal Sutherland, Dallas, TX (US)

(*) Notice: Subject to any disclaimer, the term of this patent is extended or adjusted under 35 U.S.C. 154(b) by 0 days.

(21) Appl. No.: 14/672,376

(22) Filed: Mar. 30, 2015

(65) Prior Publication Data

US 2016/0286966 A1    Oct. 6, 2016

(51) Int. Cl.
| A47C 3/027 | (2006.01) |
| A47C 9/00 | (2006.01) |
| A47C 3/029 | (2006.01) |
| A47C 3/03 | (2006.01) |
| G09B 19/00 | (2006.01) |

(52) U.S. Cl.
CPC ............ *A47C 9/002* (2013.01); *A47C 3/029* (2013.01); *A47C 3/03* (2013.01); *G09B 19/003* (2013.01)

(58) Field of Classification Search
CPC ............ A47C 9/002; A47C 3/029; A47C 3/03
USPC ......... 297/270.1, 270.5, 271.5, 271.6, 272.1, 297/314
See application file for complete search history.

(56) References Cited

U.S. PATENT DOCUMENTS

| 1,889,646 A * | 11/1932 | Ernst ...................... | A47C 3/029 297/270.5 X |
| 2,246,057 A * | 6/1941 | Michaelis .............. | A47C 3/021 297/287 |
| 2,255,160 A * | 9/1941 | Gordon .................. | A63G 13/06 297/270.5 X |
| 2,803,461 A * | 8/1957 | Coplin ............... | A63B 21/0004 297/271.5 |
| 2,988,358 A * | 6/1961 | Mills ...................... | A63G 23/00 297/270.1 |
| 3,556,591 A * | 1/1971 | Smith .................... | A47C 16/02 297/270.5 |
| D235,709 S * | 7/1975 | Schier ........................... | 297/239 |
| 4,025,107 A * | 5/1977 | Chippa .................. | A47C 3/029 297/258.1 X |
| 4,084,273 A * | 4/1978 | Haynes ................ | A47D 13/102 297/270.1 |
| 4,141,588 A * | 2/1979 | Anderson ............ | A47D 13/102 297/271.5 |
| 4,218,093 A * | 8/1980 | Gertz ................... | A47C 16/025 297/270.5 X |
| 4,595,234 A * | 6/1986 | Kjersem ................ | A47C 9/002 297/271.6 |
| 4,786,105 A * | 11/1988 | Sheehan ................ | A47C 3/029 297/271.6 |

(Continued)

OTHER PUBLICATIONS

Ergonomic LLC, "Ergonomic Chairs," published prior to Mar. 30, 2015, can be found at www.backapp.com/us/products/; (1 page).

(Continued)

*Primary Examiner* — Rodney B White

(57) ABSTRACT

An embodiment includes a user-stabilized stool having a bottom portion for contacting a ground surface that is configured to be inherently unstable when in an active position, thereby requiring a user to stabilize the stool when in the active position. The stool further includes a seat portion connected to the bottom portion and a stabilizing member operable, when the bottom portion is in the active position, to prevent the user-stabilized stool from tilting beyond a predetermined angle.

18 Claims, 4 Drawing Sheets

(56) References Cited

U.S. PATENT DOCUMENTS

| | | | | |
|---|---|---|---|---|
| D323,434 S * | 1/1992 | Moynihan | | D6/368 |
| 5,112,103 A * | 5/1992 | Downer | | A47C 3/029 |
| | | | | 297/270.1 X |
| 5,695,244 A * | 12/1997 | Gillern | | A47C 3/12 |
| | | | | 297/271.6 |
| 5,887,944 A * | 3/1999 | Boost | | A47D 13/102 |
| | | | | 297/271.5 X |
| 6,024,409 A * | 2/2000 | Collins | | A47C 3/029 |
| | | | | 297/271.6 X |
| D459,598 S | 7/2002 | Andersen et al. | | |
| 6,834,916 B2 * | 12/2004 | Volkman | | A47C 9/027 |
| | | | | 297/270.1 |
| 6,854,800 B2 * | 2/2005 | Perego | | A47D 1/02 |
| | | | | 297/270.5 X |
| D514,343 S * | 2/2006 | Pilcher | | D6/372 |
| 7,147,284 B2 * | 12/2006 | Mills | | A47C 3/029 |
| | | | | 297/270.1 X |
| 7,374,517 B2 * | 5/2008 | Lockett | | A63B 21/0004 |
| | | | | 297/271.5 |
| 7,380,879 B2 * | 6/2008 | Fletcher | | A47C 3/12 |
| | | | | 297/270.1 X |
| 7,478,878 B2 * | 1/2009 | Oettinger | | A47C 3/029 |
| | | | | 297/271.5 |
| 7,597,397 B2 * | 10/2009 | McCoy | | A47C 3/18 |
| | | | | 297/271.6 X |
| 7,837,161 B2 * | 11/2010 | Chase | | A47B 91/06 |
| | | | | 16/42 T |
| 8,056,976 B1 * | 11/2011 | Polk | | A47C 3/029 |
| | | | | 297/270.1 X |
| 8,256,845 B2 * | 9/2012 | Wang | | A47C 5/02 |
| | | | | 297/446.1 |
| 8,590,907 B2 * | 11/2013 | Hurt | | A47C 7/006 |
| | | | | 280/47.131 |
| 8,622,473 B2 * | 1/2014 | Walsh | | A47C 3/021 |
| | | | | 297/287 |
| 8,646,841 B2 * | 2/2014 | Molnar | | A47C 7/004 |
| | | | | 297/344.21 |
| 8,998,319 B2 * | 4/2015 | Bahneman | | A47C 9/00 |
| | | | | 297/270.1 X |
| 9,010,867 B2 * | 4/2015 | Martin | | A47C 3/029 |
| | | | | 297/271.5 |
| 9,237,809 B2 * | 1/2016 | Kassanoff | | A47C 3/04 |
| 9,596,936 B2 * | 3/2017 | Bahneman | | A47C 9/00 |
| 2003/0164633 A1 * | 9/2003 | Jakus | | A47C 9/002 |
| | | | | 297/271.5 |
| 2003/0209925 A1 * | 11/2003 | Bosman | | A47B 7/02 |
| | | | | 297/239 |
| 2004/0104613 A1 * | 6/2004 | Bosman | | A47B 7/02 |
| | | | | 297/451.3 |
| 2013/0334846 A1 * | 12/2013 | Bahneman | | A47C 9/00 |
| | | | | 297/195.11 |

OTHER PUBLICATIONS

Steelcase Inc., "Buoy" Chair, published prior to Mar. 30, 2015; (7 pages).

Thomas Heatherwick, "Spun Chair," published prior to Mar. 30, 2015, can be found at http://www.heatherwick.com/category/small/; (4 pages).

MutualArt Inc., "Stella Chair," published prior to Mar. 30, 2015, can be found at http://www.mutualart.com/Artwork/Stella-Chair/2E345931551556A9; (1 page).

Pedro Gomes, "Bounce Chair," published prior to Mar. 30, 2015, can be found at http://www.pedrogomesdesign.com/23570/464727/projects/bounce-chair; (1 page).

* cited by examiner

USER STABILIZED STOOL

TECHNICAL FIELD

This disclosure relates to stools for seating in general, and more particularly, user stabilized stools.

BACKGROUND

People are increasingly more sedentary in their day-to-day lives, and spend much of their time seated. Ergonomic chairs are being introduced into the market place to help address the stress placed on the body when a person spends so much of their time in a seated position. A chair that causes a person's body to be actively engaged to help support the body while in the seated position may be beneficial to not only reduce stress on the body but also help exercise the body despite the body being in a seated position.

SUMMARY

In a first embodiment, an ergonomic chair is presented. The chair includes a seating platform; a rounded, bottom portion configured to contact a ground surface; and a stabilizing member connecting the bottom portion and the seating platform, such that the stabilizing member is configured to contact the ground surface when a user is not sitting on the seating platform.

In certain aspects, the stabilizing member further comprises a first end connected to the bottom portion, a second end connected to the seating platform, and a resting surface positioned between the first end and the second end.

In one aspect, the stabilizing member comprises a resting surface extending from the bottom portion, the resting surface operable to contact the ground surface when the ergonomic chair is not in use.

In another aspect, the stabilizing member comprises a resting surface extending in an opposite facing direction from a forward facing position of the seating platform.

In yet another aspect, the rounded, bottom portion is operable to rotate up to ninety degrees in directions other than backwards relative to the forward facing position of the seating platform.

In certain aspect, the ergonomic chair is in either a stable state or an inherently unstable state.

In one aspect, the ergonomic chair is operable to be stabilized when in the inherently unstable state by a user sitting on the ergonomic chair.

In another aspect, the chair may rock in a backwards direction approximately ten degrees before the stabilizing member contacts the ground surface.

In yet another aspect, the stabilizing member is operable to provide feedback to a user.

In certain aspects, the rounded, bottom portion is formed of a material that resists deformation when the user sits on the seating platform.

In another embodiment, a stool is presented. The stool includes a bottom portion configured to contact a ground surface. The bottom portion has an inherently unstable configuration. The stool further includes a stabilizing member connected to the bottom portion, such that the stabilizing member has a first end connected to the bottom portion, a stabilizing surface extending from the bottom portion and operable to contact the ground surface when the seating apparatus is not in use, and a second end. A seat is connected to the second end of the resting member.

In certain aspects, the stool is configured to rotate backwards onto the stabilizing member when the stool transitions from an active position to an inactive position.

In other aspects, the seat has a forward facing position such that a user faces forward when seated on the seat and wherein the stabilizing surface is extended from the bottom portion in a direction opposite the forward facing position of the seat.

In another aspect, the stool may only pivot backwards approximately ten degrees before the stabilizing member contacts the ground surface.

In yet another aspect, the bottom portion is operable to rotate up to ninety degrees in directions other than a backwards direction relative to a forward facing position of the seat.

In certain aspects, the stool is either in a stable state or an inherently unstable state.

In other aspects, the stool is operable to be stabilized when in the inherently unstable state by a user sitting on the stool.

In another aspect, the stabilizing member is operable to provide feedback to a user regarding an angle of the stool.

In yet another embodiment, a user-stabilized stool is presented. The stool includes a bottom portion for contacting a ground surface that is configured to be inherently unstable when in an active position, requiring a user to stabilize the stool when in the active position. A seat portion is connected to the bottom portion. The stool further includes a stabilizing member operable, when the bottom portion is in the active position, to prevent the user-stabilized stool from tilting beyond a predetermined angle.

In certain aspects, the stool is configured to rotate backwards onto the stabilizing member when the user is no longer acting to stabilize the stool in the active position.

In one embodiment, a seating apparatus is presented. The apparatus has a bottom portion, a stabilizing member, and a seat. The stabilizing member includes a first end connected to the bottom portion; a second end connected to the seat; and a stabilizing surface positioned between the first end and the second end. The stabilizing surface extends from the first end, such that the stabilizing surface is configured to contact a ground surface when the seating apparatus is not in use.

In certain aspects, the stabilizing member is curved between the stabilizing surface and the second end.

In other aspects, the stabilizing surface provides feedback to a user when the user leans the seating apparatus backwards more than five degrees.

DESCRIPTION OF THE FIGURES

The accompanying drawings facilitate an understanding of the various embodiments.

DETAILED DESCRIPTION

Figure 1:
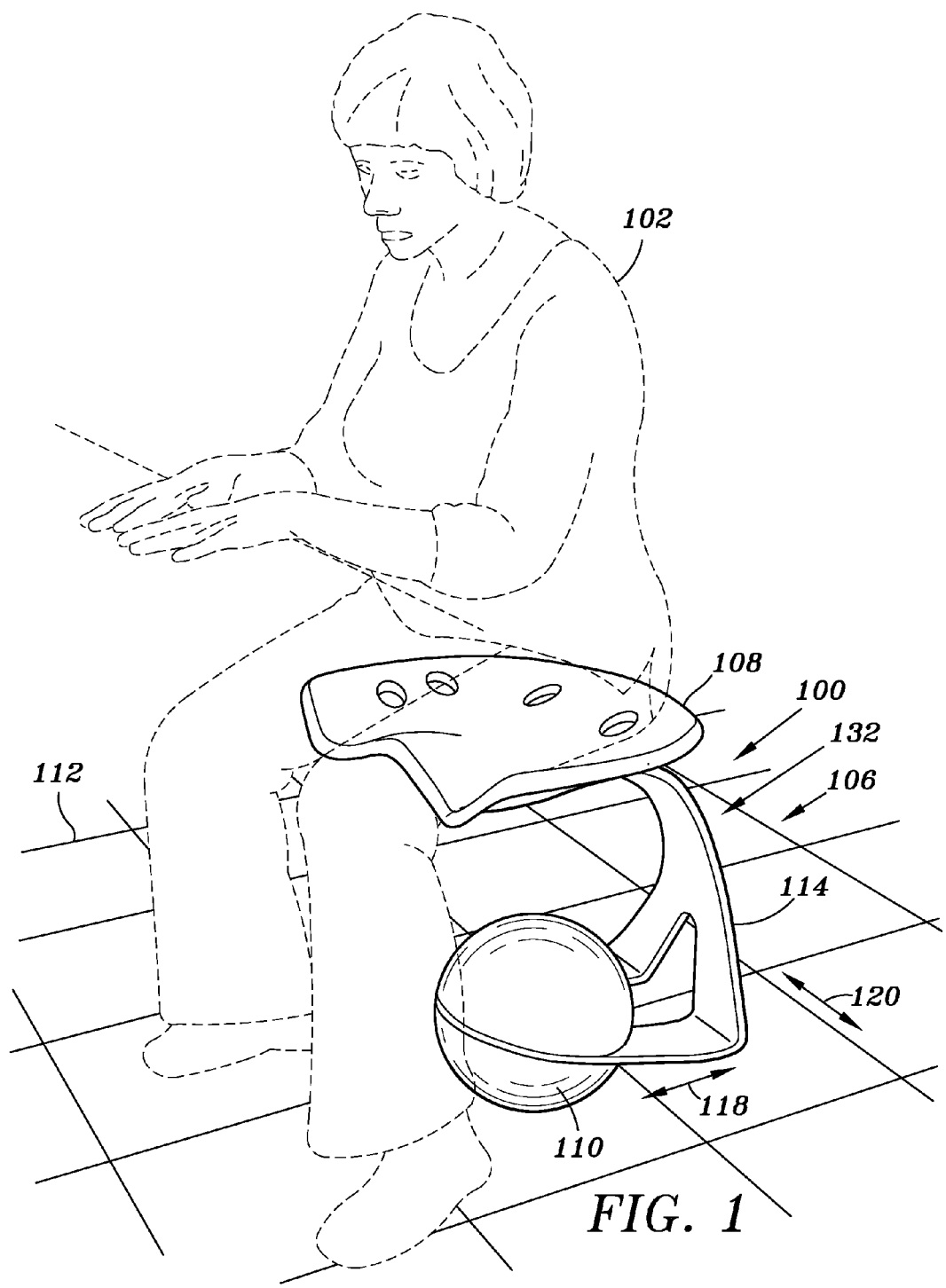
FIG. 1 illustrates a perspective view of a seating apparatus according to one embodiment, being employed by a user, the user acting to stabilize the seating apparatus.
Figure 2:
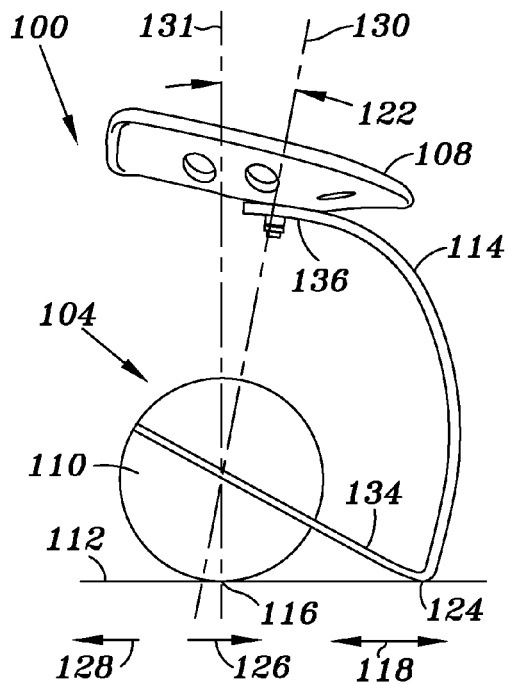
FIG. 2 illustrates a side view of the seating apparatus of FIG. 1 in a stable state.
Figure 3:
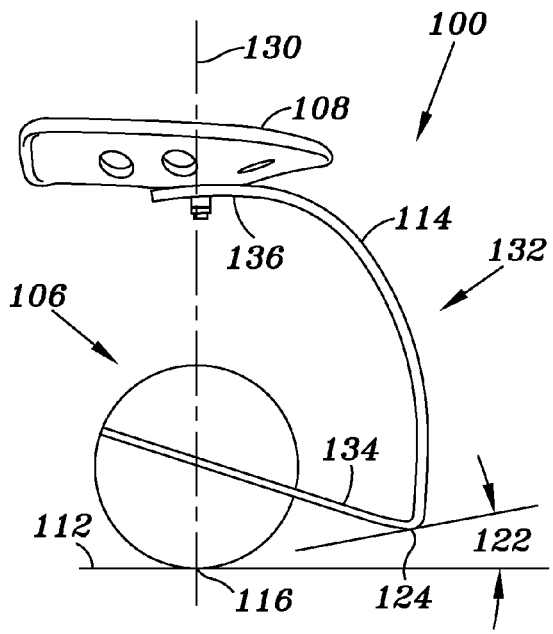
FIG. 3 illustrates a side view of the seating apparatus of FIG. 1 in an inherently unstable state.
Figure 8:
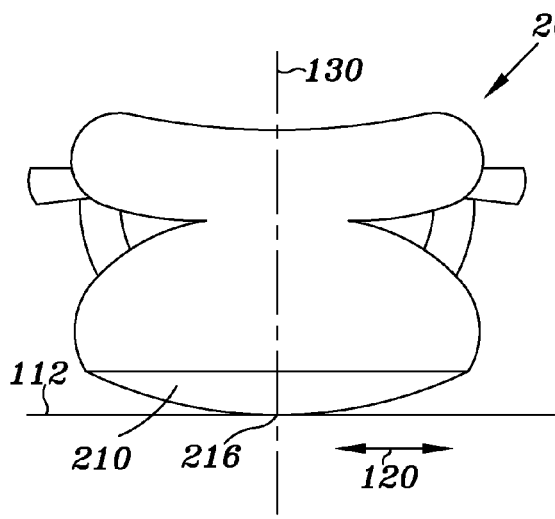
FIG. 8 illustrates a front view of the seating apparatus of FIG. 4.

Referring to FIGS. 1-3, an illustrative embodiment of a stool 100 with a user 102 seated on the stool 100 is presented. In some aspects, the stool 100 is ergonomic in that it is intended to provide optimal comfort and to avoid stress or injury to the user 102. In other aspects, the stool 100 is configured to actively engage the user's 102 body to help provide exercise to the user 102 despite the user 102 being in a seated position. In yet some aspects, the stool 100 is both ergonomic and actively engages, e.g. provides exercise to, the user 102. The stool 100 has a stable state 104, which is illustrated in FIG. 2, and an unstable state 106, which is illustrated in FIGS. 1 and 3. When the stool 100 is in the unstable state 106, the user 102 acts to stabilize the stool 100 as will be described in more detail. The user's 102 interaction with the stool 100 is such that the user 102 must actively engage their body to stabilize the stool, which might provide the aforementioned benefits.

The stool 100, which may also be referred to as a chair, includes a seat portion 108, a bottom portion 110 for contacting a ground surface 112 and a stabilizing member 114. The seat portion 108 may be any part of the stool 100 that is operable to or configured for accommodating the user 102 when the user 102 is in a seated position. The seat portion 108 may be manufactured as an integral part of the stool 100 or may be a stand-alone piece that is part of an assembly that forms the stool 100. In one, non-limiting embodiment, the seat portion 108 is configured to orient the user 102 in a particular direction. For example, the seat portion 108 may include indentations that correspond to different areas of the user's 102 body.

Figure 9:
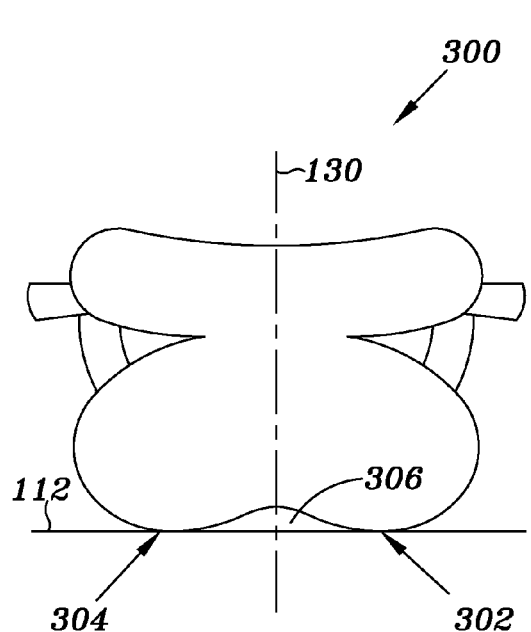
FIG. 9 illustrates a front view of a seating apparatus according to one embodiment.
Figure 4:
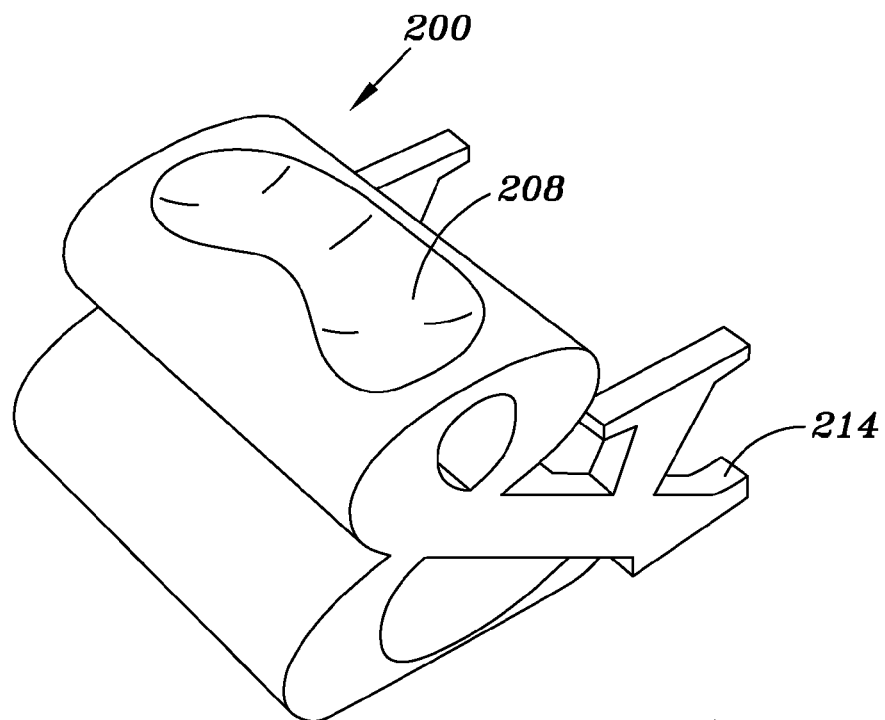
FIG. 4 illustrates a top, perspective view of a seating apparatus according to one embodiment.
Figure 5:
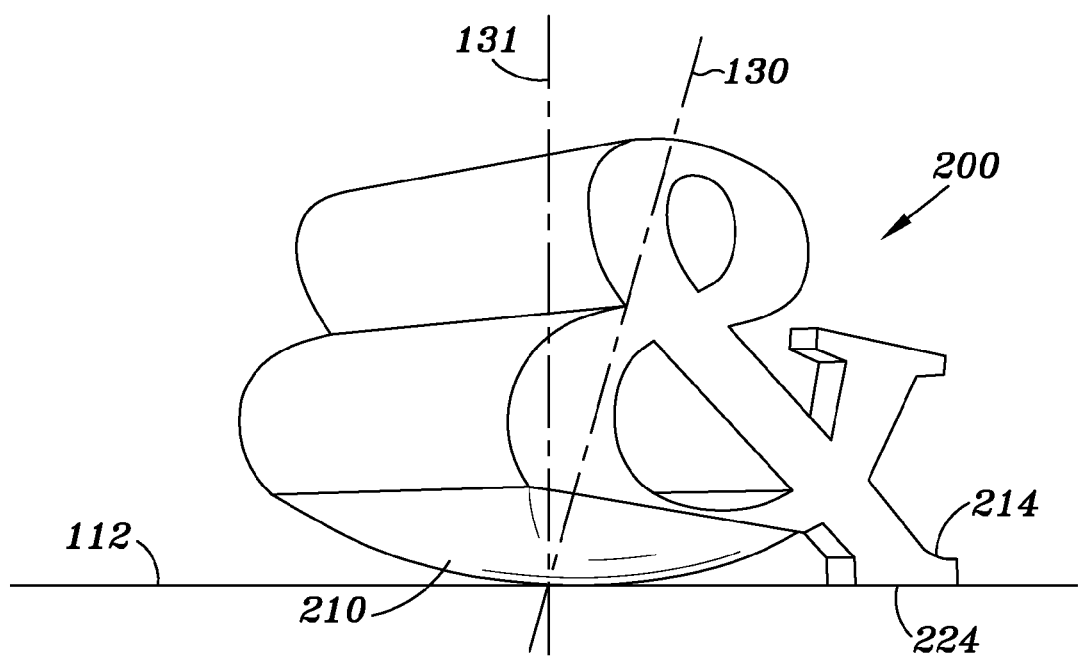
FIG. 5 illustrates a bottom, perspective view of the seating apparatus of FIG. 4.

The bottom portion 110 of the stool 100 contacts the ground surface 112 and is configured to be inherently unstable such that the bottom portion 110 will have a tendency to roll, rotate, rock, tilt, or otherwise move relative to the ground surface 112 absent an outside intervening force such as from gravity, the user 102 using their body to somehow act against the bottom portion 110, or a stabilizing member such as the stabilizing member 114. The bottom portion 110, in some embodiments, will allow the stool 100 to rotate up to and even beyond ninety degrees in any direction absent an outside intervening force. In other words, the stool 100 may fall over absent any outside intervening force. In one embodiment, the bottom portion 110 may have a rounded shape, which allows the stool 100 to pivot, rotate, etc. in any direction. The bottom portion 110 may be formed in many different types of shapes or configurations that cause the bottom portion 110 to be inherently unstable in one or more directions. In some aspects, the bottom portion 110 is formed such that the bottom portion 110 is inherently unstable in a front/back direction 118 but stable in a side-to-side direction 120. In yet some aspects, the bottom portion 110 is formed such that the bottom portion 110 is inherently unstable in the front/back direction 118 and the side-to-side direction 120 but less so in the side-to-side direction 120 than in the front/back direction 118. As will be explained in more detail later, FIG. 9 illustrates one such embodiment where the bottom portion is configured such that it is inherently unstable in the front/back direction and the side-to-side direction but less so in the side-to-side direction.

The shape of the bottom portion 110 may contact the ground surface 112 at a single contact point 116, such as would occur when the bottom portion 110 is a round or similar-type shape. The contact point 116 is where the bottom portion 110 comes into contact with the ground surface 112. In other embodiments, there may be more than one contact point between the bottom portion and the ground surface (as illustrated in FIG. 9). The contact point 116 may vary in the size of its surface area depending on the configuration of the bottom portion 110. For example, if the bottom portion 110 is oval shaped, the contact point 116 may have a larger surface area than if the bottom portion 110 is round shaped. The material used to form the bottom portion 110, or other similar aspects, may also factor into the size of the contact point's 116 surface area. For example, materials and configuration of the bottom portion 110 will factor into whether or how much the bottom portion 110 may deflect or compress when the user 102 sits on the stool 100. The amount of deflection or compression in the bottom portion 110 will change the size of the contact point's 116 surface area. It will be appreciated by one of skill in the art that the greater the contact point's 116 surface area, the more stable the bottom portion 110 becomes. Consequently, the smaller the contact point's 116 surface area, the less stable the bottom portion 110 becomes. Additionally, the more contact points 116 the more stable the stool. In some embodiments, the bottom portion 110 is formed of a material that will not have any appreciable deflection/compression when the user 102 is seated on the stool 100. The more unstable the stool 100 the more the user 102 must interact to stabilize the stool 100 and themselves.

The bottom portion 110, in a non-limiting, exemplary embodiment may be formed of steel or rubber. The bottom portion 110 may be manufactured as an integral part of the stool 100 or may be a stand-alone piece that is part of an assembly that forms the stool 100.

Still referring to FIGS. 1-3, the stool 100 further includes the stabilizing member 114 configured to prevent the stool from tilting, rotating or otherwise moving beyond a predetermined angle 122. As illustrated in FIGS. 1-3, the stabilizing member 114 extends in a backward direction 126 opposite to a forward direction 128 in which the seat portion 108 may, in some embodiments, orient the user 102. The stabilizing member 114 is configured to contact the ground surface 112 when the user 102 is not positioned on the stool 100. In one embodiment, the stool 100 is configured such that when the user 102 stands up from the stool 100, the stool 100 is biased in the backward direction 126 so that the stool 100 is caught by and rests on the stabilizing member 114. The stabilizing member 114 may be the biasing force. For example, the shape or weight of the stabilizing member 114 will bias the stool 100 in the backward direction of the stabilizing member 114. The stabilizing member 114 may include a resting surface 124 for contacting the ground surface 112 when the stool 100 is not in use. The stool 100 may be in the stable state 104 when the stabilizing member 114 and, in particular, the resting surface 124 is contacting the ground surface 112. The stool 100 is in an active position 132 when the user 102 engages the stool 100 and the stool 100 is in the unstable state 106.

In some embodiments, the stabilizing member 114 or the resting surface 124 of the stabilizing member 114 is configured to provide feedback to the user 102, indicating to the user 102 the position or angle of the stool 100. The stabilizing member 114 may be configured such that the feedback indicates that the stool 100 is tilting backwards to such a degree that the user 102 may no longer be able to act as a stabilizing force, wherein the user 102 may fall off the stool 100. For example, if the user 102 were to lean too far back, the user's 102 weight may create an instability such that the user 102 is no longer able to use their body to help stabilize the stool 102 when it is in an unstable state 106, thereby causing the user 102 to fall backwards. In one embodiment, the feedback acts as a warning to the user 102.

In one, non-limiting embodiment, the predetermined angle 122 is between approximately five to ten degrees. The predetermined angle 122 is the angular distance between the ground surface 112 and the resting surface 124 of the stabilizing member 124 when the seat portion 108 is substantially parallel to the ground surface 112. For further illustrative purposes, a reference axis 131 is shown, which is perpendicular to the ground surface 112, as well as a longitudinal axis of the stool 100. In one embodiment, the predetermined angle 122 is less than five degrees. In another embodiment, the predetermined angle is between approximately five and forty-five degrees. The predetermined angle 122 may change based on the configuration of the stool 100 and will be determined based on safety parameters to warn the user 102 or help prevent the user 102 from falling off of the stool 100 in the backwards direction 126. If the user 102 leans too far back, the user 102 may no longer be able to use their legs or arms to help stabilize the stool 100 when the stool 100 is in an unstable state 106, causing the user 102 to fall.

In one non-limiting embodiment, the stool 100 includes the seat portion 108, the bottom portion 110, and the stabilizing member 114, where the stabilizing member 114 connects the bottom portion 110 and the seat portion 108. In some embodiments, the stabilizing member 114 includes a first end 134 connected to the bottom portion 110 and a second end 136 connected to the seat portion 108. In still some embodiments, the stabilizing member 114 is curved, allowing the resting surface 124 to be positioned between the first end 134 and the second end 136. The stabilizing member 114 may extend from the bottom portion 110 in the backward direction 126 opposite from the forward direction 128 for which the seat portion 108 faces. It will be appreciated by one of skill in the art that there are a number of ways to combine the components of the stool 100 and that the above description is not meant to be limiting. For example, the seat portion 108 may be directly connected to the bottom portion 110 with the stabilizing member 114 extending from one of the seat portion 108 or the bottom portion 110. It should further be appreciated that the stool 100, while comprised of several components, is one integral piece that may be formed by molding, extrusion, or other form of manufacturing.

In operation, the stool 100 may initially be in the stable state 104 with the resting surface 124 of the stabilizing member 114 touching the ground surface 112. In this embodiment, the stool 100 is initially tilted backwards. The user 102 sits on the stool 100 causing the stool 100 to rotate forward. In one embodiment, the user 102 grabs the stool 100 and rotates the stool 100 forward before sitting on the stool 100. Once the user 102 sits on the stool 100 and the stabilizing member 114 is no longer touching the ground surface 112, the stool 100 is in the active position 132, which puts the stool 100 in the unstable state 106. The user 102 acts to stabilize the stool 100 when the stool 100 is in the unstable state 106 using feet positioned on the floor, counteractive movements in the user's musculature, or a combination thereof. In one embodiment, the stool 100 is configured to be unstable enough that the user 102 must utilize both feet to stabilize the stool 100. In one, exemplary embodiment, the user's 102 weight is directly over the contact point 116 when the user 102 is sitting on the stool 100. The stool 100 may have a tendency to tilt in various directions if the user 102 does not maintain an active engagement of their body. In some circumstances, the stool 100 may tilt backwards. If the stool 100 tilts too far back, the resting surface 124 or the stabilizing member 114 will contact the ground surface 112 to prevent the stool 100 from tilting back past a certain limit. When the user 102 is done sitting, the user 102 may stand and the stool 100 will rotate backwards until the resting surface 124 of the stabilizing member 114 contacts the ground surface 112. In some embodiments, the stabilizing member 114 acts as a biasing force such that the stool 100 will have a tendency to tilt backwards in the direction of the resting member 124.

Figure 6:
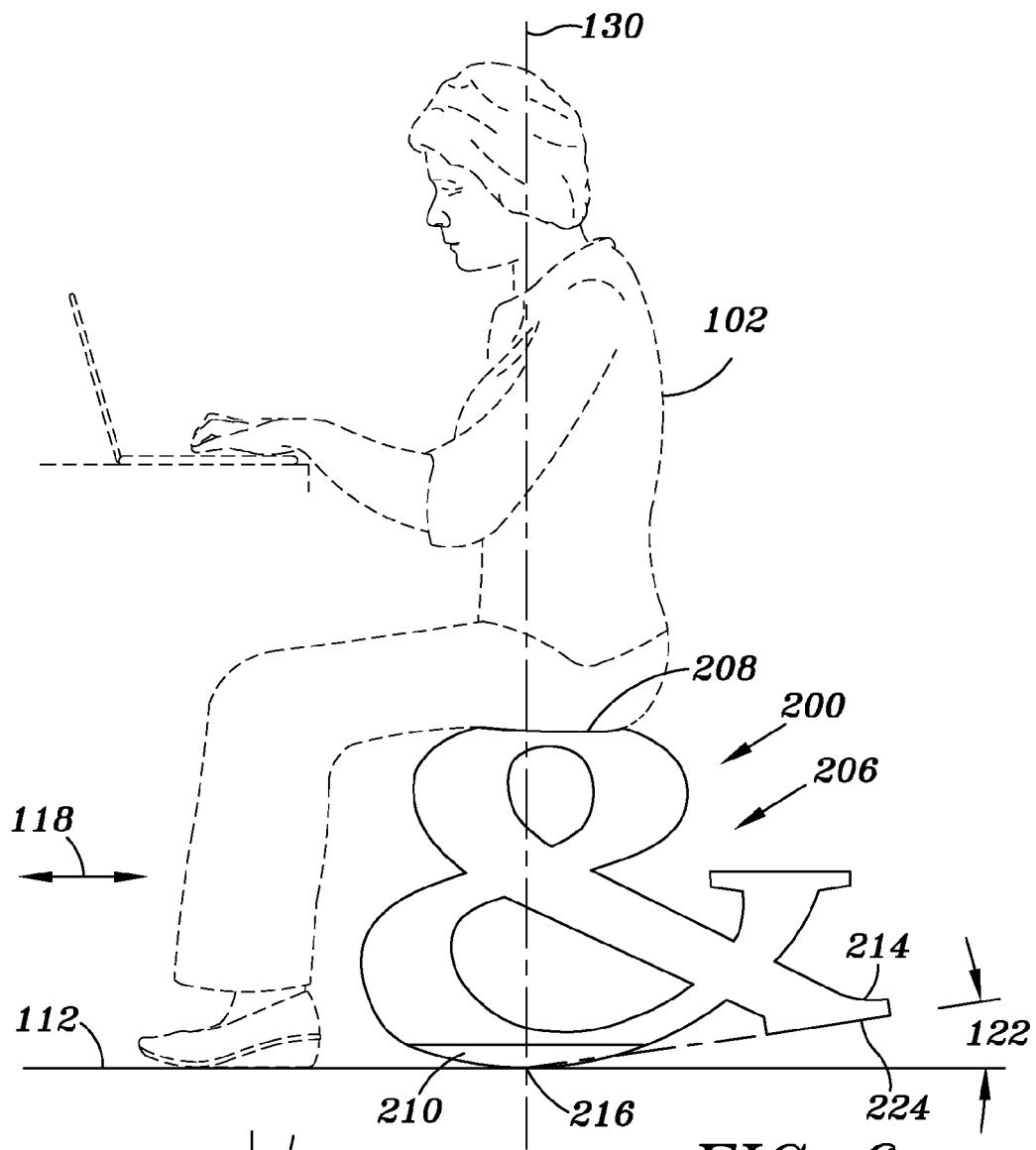
FIG. 6 illustrates a side view of the seating apparatus of FIG. 4 in an inherently unstable state.
Figure 7:
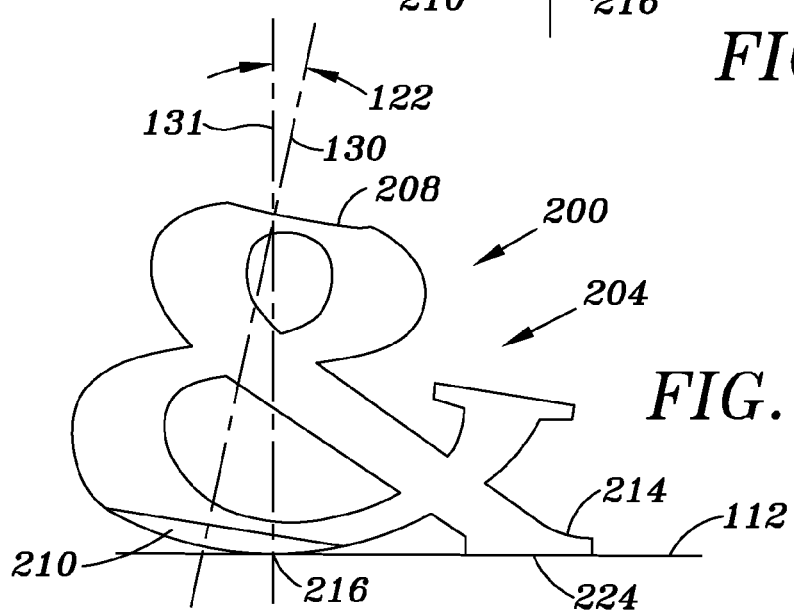
FIG. 7 illustrates a side view of the seating apparatus of FIG. 4 in a stable state.

Referring now to FIGS. 4-8, another illustrative embodiment of a stool 200 that is inherently unstable when in use by the user 102, is presented. The stool 200, similar to the stool 100 disclosed above, requires the user 102 to stabilize the stool 200 when the stool 200 is in an active position 232. The stool 200 may be both ergonomic and actively engages, e.g. provides exercise to, the user 102. The stool 200 has a stable state 204, which is illustrated in FIG. 7, and an unstable state 206, which is illustrated in FIG. 6. When the stool 200 is in the unstable state 206, the user 102 acts to stabilize the stool 200.

The stool 200 includes a seat portion 208, a bottom portion 210 for contacting the ground surface 112 and a stabilizing member 214. The seat portion 208 may be any part of the stool 200 that is operable to or configured for accommodating the user 102 when the user 102 is in a seated position. The seat portion 208 may be manufactured as an integral part of the stool 200 or may be a stand-alone piece that is part of an assembly that forms the stool 200. In one, non-limiting embodiment, the seat portion 208 is configured to orient the user 102 in a particular direction. For example, the seat portion 208 may include indentations that correspond to different areas of the user's 102 body.

The bottom portion 210 of the stool 200 contacts the ground surface 112 and is configured to be inherently unstable such that the bottom portion 210 will have a tendency to roll, rotate, rock, tilt, or otherwise move relative to the ground surface 112 absent an outside intervening force such as from gravity, the user 102 using their body to somehow act against the bottom portion 210, or a stabilizing member such as the stabilizing member 214. The bottom portion 210, in some embodiments, will allow the stool 200 to rotate up to and even beyond ninety degrees in any direction absent an outside intervening force. In other words, the stool 200 may fall over absent any outside intervening force. The bottom portion 210 may be formed in many different types of shapes or configurations that cause the bottom portion 210 to be inherently unstable in one or more directions. In some aspects, the bottom portion 210 is formed such that the bottom portion 210 is inherently unstable in the front/back direction 118 and the side-to-side direction 120 but less so in the side-to-side direction 120 than in the front/back direction 118.

The shape of the bottom portion 210 may contact the ground surface 112 at a single contact point 216, such as would occur when the bottom portion 210 is a round or similar-type shape. The contact point 216 is where the bottom portion 210 comes into contact with the ground surface 112. The contact point 216 may vary in the size of its surface area depending on the configuration of the bottom portion 210. The material used to form the bottom portion 210, or other similar aspects, may also factor into the size of the contact point's 216 surface area.

Still referring to FIGS. 4-8, the stool 200 further includes the stabilizing member 214 configured to prevent the stool from tilting, rotating or otherwise moving beyond a predetermined angle 122. The stabilizing member 214 may extend in the backward direction 126 opposite to the forward direction 128 in which the seat portion 208 may, in some embodiments, orient the user 102. The stabilizing member 214 is configured to contact the ground surface 112 when the user 102 is not positioned on the stool 200. In one embodiment, the stool 200 is configured such that when the user 102 stands up from the stool 200, the stool 200 is biased in the backward direction 126 so that the stool 200 is caught by and rests on the stabilizing member 214. The stabilizing member 214 may be the biasing force. For example, the shape or weight of the stabilizing member 214 will bias the stool 200 in the backward direction of the stabilizing member 214. The stabilizing member 214 may include a resting surface 224 for contacting the ground surface 112 when the stool 200 is not in use. The stool 200 may be in the stable state 204 when the stabilizing member 214 and, in particular, the resting surface 224 is contacting the ground surface 112. The stool 200 is in the active position 232 when the user 102 engages the stool 200 and the stool 200 is in the unstable state 206.

In some embodiments, the stabilizing member 214 or the resting surface 224 of the stabilizing member 214 is configured to provide feedback to the user 102, indicating to the user 102 the position or angle of the stool 200. If the user 102 leans too far back, the user 102 may no longer be able to use their legs or arms to help stabilize the stool 200 when the stool 200 is in an unstable state 206, causing the user 102 to fall.

Referring now to FIG. 9, a stool 300 is presented. The stool 300 is similar to the stool 200, described with reference to FIGS. 4-8, with the exception that the stool 300 includes two points of contact 302, 304 with a cavity or trench 306 positioned between the two points of contact 302, 304. In this embodiment, the stool 300 is inherently unstable in the front/back direction 118 and the side-to-side direction 120 but less so in the side-to-side direction 120 because the addition of a second point of contact helps stabilize the stool 300. The distance between the two points of contact 302, 304 can affect the side-to-side stability of the stool 300. A greater distance between the two points of contact 302, 304 will cause the stool 300 to be more stable in the side-to-side direction 120 than if the two points of contact 302, 304 are closer together. The placement of the two points of contact 302, 304 may be changed during manufacture depending on the level of inherent stability or unstability desired. The more unstable the stool 300 the more the user 102 must interact to stabilize the stool 300 and themselves. The same effect can be achieved by a single contact point where there is a different slope in the forward/back direction than in the sideways direction.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise," "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. An ergonomic chair comprising:
   a seating platform;
   a rounded bottom portion configured to contact a ground surface, wherein the rounded, bottom portion is configured to rotate front-to-back and side-to-side; and
   a stabilizing member connecting the bottom portion and the seating platform, the stabilizing member having a resting surface extending behind the seating platform and the rounded bottom portion;
   wherein the resting surface is configured to contact the ground surface when a user is not sitting on the seating platform.

2. The ergonomic chair of claim 1, wherein the stabilizing member comprises a resting surface extending in an opposite facing direction from a forward facing position of the seating platform and wherein the chair is configured to rotate backwards onto the stabilizing member when the user is no longer acting seated on the seating platform.

3. The ergonomic chair of claim 1, being in either a stable state or an inherently unstable state.

4. The ergonomic chair of claim 3, wherein the ergonomic chair is operable to be stabilized when in the inherently unstable state by a user sitting on the ergonomic chair.

5. The ergonomic chair of claim 1, wherein the chair may rock in a backwards direction approximately ten degrees before the stabilizing member contacts the ground surface.

6. The ergonomic chair of claim 1, wherein the stabilizing member is operable to provide feedback to a user.

7. The ergonomic chair of claim 1, wherein the rounded, bottom portion is formed of a material that resists deformation when the user sits on the seating platform.

8. A stool comprising:
   a seat;
   a bottom portion configured to contact a ground surface, the bottom portion having an inherently unstable configuration, wherein when the bottom portion is in the inherently unstable configuration, the bottom portion is configured to rotate in any direction;
   a stabilizing member having a first end, a second end, and a resting surface between the first end and the second end, the bottom portion is connected to the first end, the seat connected to the second end, the resting surface extending behind the bottom portion and the seat;

wherein the resting surface is configured to contact the ground surface when the stool is not in use.

9. The stool of claim 8, wherein the bottom portion is has a substantially spherical shape.

10. The stool of claim 8, wherein the stool is configured to rotate backwards onto the stabilizing member when the stool transitions from an active position to an inactive position.

11. The stool of claim 8, the seat having a forward facing position such that a user faces forward when seated on the seat and wherein the stabilizing surface is extending from the bottom portion in a direction opposite the forward facing position of the seat.

12. The stool of claim 8, wherein the stool may only pivot backwards approximately ten degrees before the stabilizing member contacts the ground surface.

13. The stool of claim 8, being in either a stable state or an inherently unstable state.

14. The stool of claim 8, wherein the stool is operable to be stabilized when in the inherently unstable state by a user sitting on the stool.

15. The stool of claim 8, wherein the stabilizing member is operable to provide feedback to a user regarding an angle of the stool.

16. A user-stabilized stool, comprising:

a bottom portion for contacting a ground surface that is configured to be inherently unstable in any radial direction when in an active position, requiring a user to stabilize the stool when in the active position;

a seat portion connected to the bottom portion; and a stabilizing member extending from the seat portion in a backward direction opposite to a forward direction of the seat portion, the stabilizing member configured to bias the stool in the backward direction of the stabilizing member so that a resting surface of the stabilizing member contacts the ground surface when the user is not positioned on the stool, preventing the user-stabilized stool from tilting, rotating or otherwise moving when not in use.

17. The user-stabilized stool of claim 16, wherein the stool is configured to rotate backwards onto the stabilizing member when the user is no longer acting to stabilize the stool in the active position.

18. The ergonomic chair of claim 1, wherein the rounded, bottom portion is inherently unstable in all directions in an active position.

* * * * *